United States Patent [19]

Rubin

[11] 4,402,590

[45] Sep. 6, 1983

[54] AUTOMATIC REPLENISHER CONTROL FOR MULTIPROCESS PHOTOGRAPHIC PROCESSOR

[75] Inventor: Barry P. Rubin, Maple Grove, Minn.

[73] Assignee: Pako Corporation, Minneapolis, Minn.

[21] Appl. No.: 282,448

[22] Filed: Jul. 13, 1981

[51] Int. Cl.³ .......................... G03D 3/06; G06F 15/46

[52] U.S. Cl. .......................................... 354/324; 364/502

[58] Field of Search ........................ 354/298, 324–327; 355/10; 222/14, 15, 638–644; 137/624.11, 624.13, 624.15; 134/64 P, 122 P, 94, 95; 364/502, 525

[56] References Cited

U.S. PATENT DOCUMENTS

| | | | |
|---|---|---|---|
| 3,623,416 | 11/1971 | Anderberg | 354/324 X |
| 3,787,689 | 1/1974 | Fidelman | 354/298 X |
| 4,295,729 | 10/1981 | Kaufmann | 354/324 |
| 4,332,456 | 6/1982 | Kaufmann | 354/298 |

*Primary Examiner*—William B. Perkey
*Attorney, Agent, or Firm*—Kinney, Lange, Braddock, Westman and Fairbairn

[57] ABSTRACT

A multiprocess photographic processor has a plurality of tanks through which photosensitive material is transported. Different photosensitive materials are transported through different combinations of the tanks to provide different processing while utilizing the same processor. An automatic replenishment control system stores replenishment rates for each type of photosensitive material, as well as pattern information indicating those tanks which require replenishment during a particular process. During the processing of photosensitive material, replenishment is provided to selected tanks based upon the type of photosensitive material being processed, the stored replenishment rates, and the stored pattern information associated with the particular process being used.

5 Claims, 2 Drawing Figures

AUTOMATIC REPLENISHER CONTROL FOR MULTIPROCESS PHOTOGRAPHIC PROCESSOR

BACKGROUND OF THE INVENTION

1. Field of the Invention

The present invention relates to multiprocess photographic processors. In particular, the present invention relates to replenisher controls for multiprocess photographic processors.

2. Description of the Prior Art

In the photofinishing industry, cine processor machines are used to continuously develop long webs of photographic film. Typically, several different sizes or formats of photographic film may be processed by the same cine processor. For example, in certain processors 110, 126 and 135 format film are processed. Other cine processors are capable of processing these three film formats as well as 46 mm, 120/220 and 70 mm format films.

In the prior art, cine processors typically have used flowmeters to control chemical replenishment of processor fluids. An operator has been required to manually adjust these flowmeters each time a new film type or film leader enters the cine processor. In general, therefore, the users of cine processors have been very dependent upon the skill of their operators for making accurate replenishment adjustments and, more importantly, for remembering to make the adjustments each time a new film type or film leader enters the processor.

As the processes and chemicals used to develop photographic film have continually been improved, the chemicals used for replenishment have become more concentrated. As a result, the margin for error in replenishment has decreased. Automatic replenishment of processor fluids in cine processors has become, therefore, very attractive.

Different photographic film (having different ASA number or different manufacturers) may require different processor fluids in different sequences for proper processing of the film. In order to accommodate various processes, "multiprocess" cine processors have been developed in the past. Multiprocess cine processors having as many as twelve different tanks for containing different processing fluids have been developed. Depending on the particular process being used, only selected tanks are used at any time. For example, one process might use tanks 1, 2, 4, 7, 8 and 10, while another process might use tanks 1, 2, 4, 5, 6, 11 and 12. In order to switch from one process to another, film leader is rethreaded through only those tanks which will be used with the particular process.

U.S. Pat. No. 3,699,869 by Jensen shows a prior art multiprocess cine processor in which two different tanks are provided for different developer solutions. The Jensen patent shows a mechanical arrangement for guiding the film web through either the "A" tank or the "B" tank. The mechanism also includes relays and switches which select the recirculation pump, the temperature control, and the replenishment pump for either the "A" tank or the "B" tank, depending upon the particular tank through which the mechanism is guiding the film web.

In a multiprocess cine processor, only those tanks through which the film passes require replenishment. There has been continuing need for an automatic replenishment control system for use with multiprocess cine processors which automatically provides the correct amounts of replenishment to the correct tanks for each possible process, without requiring an undue amount of operator setup time each time a change is made from one process to another.

SUMMARY OF THE INVENTION

The present invention is an automatic replenishment system for a multiprocess cine processor of photosensitive material in which a plurality of tanks are provided for containing processing fluid, and in which different photosensitive materials are processed by transporting through different combinations of those tanks. The automatic replenisher control of the present invention stores replenishment control information, which includes replenishment rates for the various tanks of the processor, and pattern information indicating the particular tanks used for each process. When a particular process is selected, the automatic replenisher control controls replenishment to the tanks in use in that process based upon the stored replenishment rates and the stored pattern information associated with the selected process.

DETAILED DESCRIPTION OF THE PREFERRED EMBODIMENTS

Figure 1:
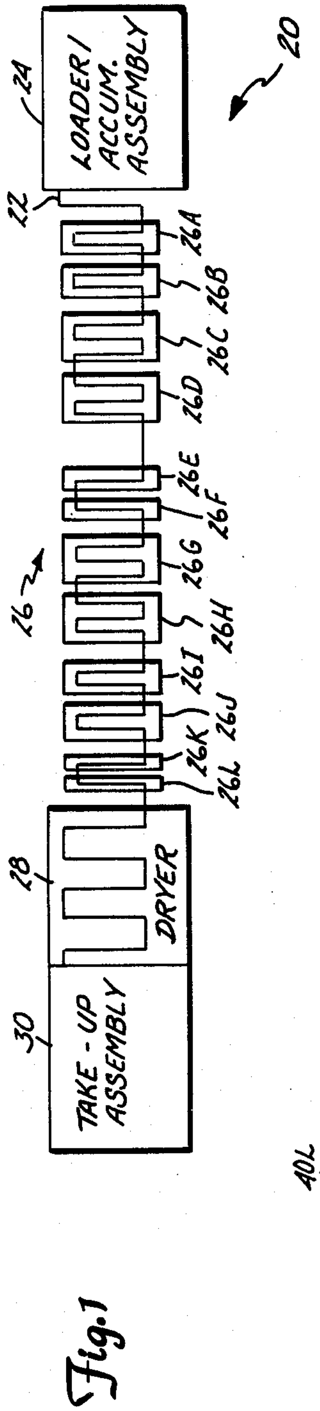
FIG. 1 is a schematic representation of a multiprocess cine processor of the type with which the automatic replenishment control system of the present invention is used.

In FIG. 1, multiprocess cine processor 20 is shown in schematic form. In processor 20, photographic film web 22 is transported from loader accumulator assembly 24, through a plurality of modular processing tanks 26, through film dryer 28, and then to takeup assembly 30. In the particular embodiment illustrated in FIG. 1, a total of twelve processing tanks or modules 26 are illustrated. These tanks are individually designated by reference characters 26A through 26L.

Depending on the particular process being used to develop film web 22, web 22 will be transported through all of modules 26A through 26L, or only selected modules. The particular combination of modules used depends, of course, upon the unique requirements of the particular process which is selected. These processes vary, of course, depending upon the chemical composition and characteristics of the photographic film to be developed. Processes vary from manufacturer to manufacturer, and also vary as a result of different film characteristics such as ASA number.

As film web 22 is transported through the various modules 26, the chemicals within modules 26 are exhausted, and must be replenished in order to maintain the required chemical activity.

Figure 2:
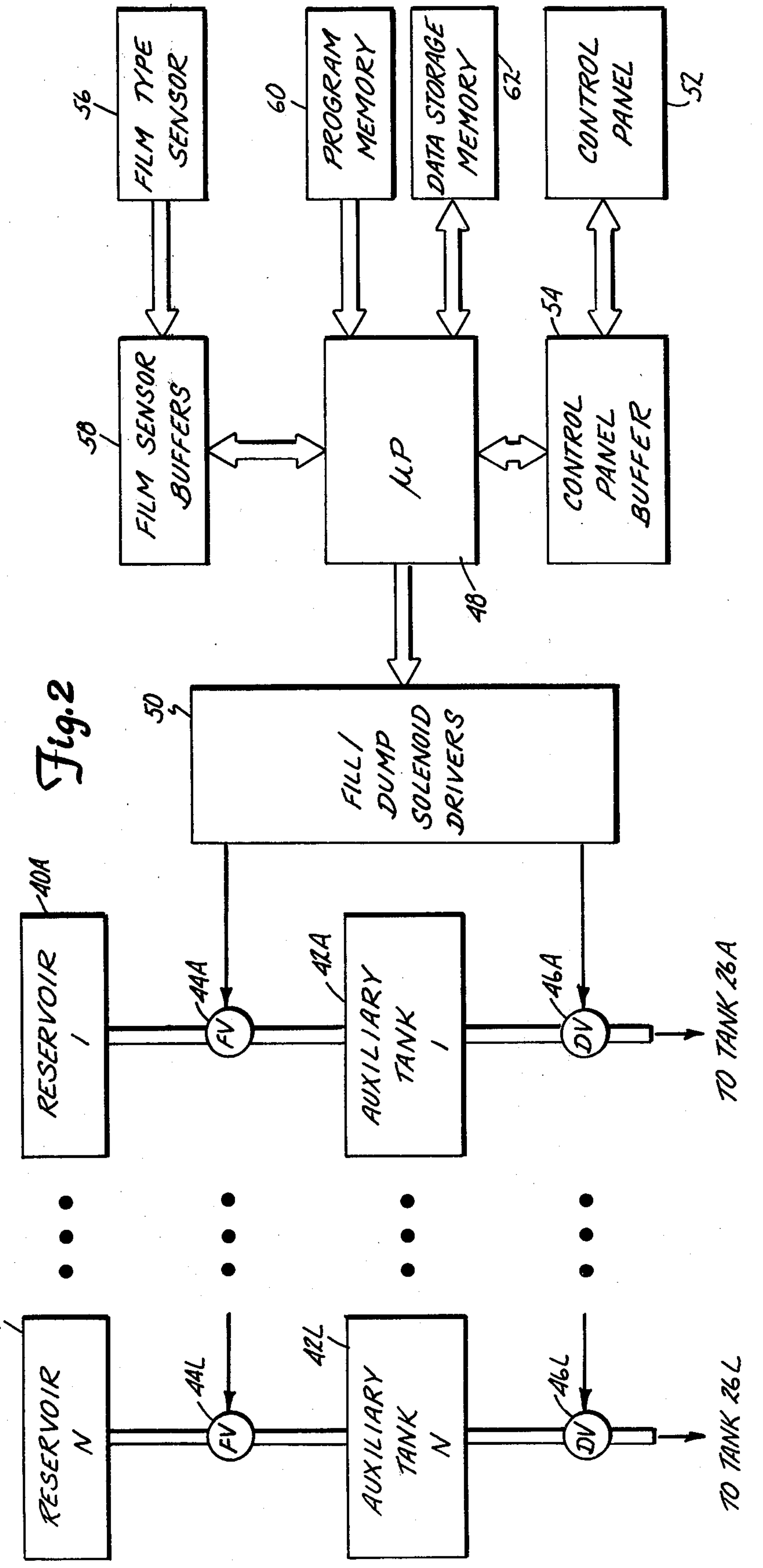
FIG. 2 is a block diagram illustrating the automatic replenishment control system of the present invention.

FIG. 2 is a block diagram of the automatic replenishment control system of the present invention, which controls the replenishment of processor fluids to modules 26, to compensate for the exhaustion of the chemicals. The replenishment control system of the present invention automatically provides the correct amount of replenishment to those modules which are in use in the particular process then being operated in processor 20.

The preferred embodiment shown in FIG. 2 utilizes a replenishment dispensing apparatus of the "fill and dump" type. The replenishment for modules 26A–26L is provided from reservoirs 40A–40L to corresponding auxiliary tanks 42A–42L, which hold predetermined amounts of replenishment fluid. Flow of fluid from reservoirs 40A–40L to auxiliary tanks 42A–42L is individually controlled by corresponding fill solenoid valves 44A–44L. Dispensing of the contents of auxiliary tanks 42A–42L to associated modules 26A–26L of processor 20 is controlled by dump solenoid valves 46A–46L.

Operation of fill solenoid valves 44A–44L and dump solenoid valves 46A–46L is controlled by microprocessor 48 through fill/dump solenoid drivers 50. Microprocessor 48 controls operation of valves 44A–44L and 46A–46L to provide the necessary replenishment for each module 26A–26L based upon operator selected input signals from control panel 52 (which are supplied through control panel buffer 54), upon film type sensor signals from film type sensor 56 (which are supplied through film sensor buffers 58), upon a predetermined operating program (which is stored in program memory 60), and upon replenishment control data (which is stored in data storage memory 62).

When a fill/dump replenishment cycle is initiated by microprocessor 48, control signals are supplied to fill-/dump solenoid drivers 50 to actuate a selected fill valve (e.g. valve 44A). Auxiliary tank 42 is thereby permitted to fill to its volume with replenishment fluid from reservoir 40A. Microprocessor 48 then deactuates fill valve 44A and actuates dump valve 46A, thereby allowing auxiliary tank 42A to dump its contents into its associated module 26A. Similar operations are performed in providing replenishment to the other modules 26B–26L.

The time interval or "cycle rate" between successive fill/dump cycles determines the amount and rate of replenishment. As discussed in further detail later, this cycle rate is automatically determined and maintained by the control system of the present invention for each tank used in a particular process.

Because of the wide range of replenishment rates required for the different solutions used in modules 26A–26L, the fill/dump time interval (or cycle rate) for the various solutions used in modules 26A–26L typically is not the same. For example, in one embodiment of the present invention, the fill/dump cycle rates range from one fill/dump every two minutes (for some developers) to one fill/dump every eight minutes (for some bleaches). The cycle rate also differs depending upon the total tank volume of the auxiliary tank 42, the type of film being processed (i.e. 110 format, 126 format, 135 format, 120/220 format, etc.), and the transport speed of web 22 through processor 20. In a preferred embodiment of the present invention, cycle rate (in seconds) is determined by microprocessor 18 according to the following relationship:

$$\text{Cycle Rate} = \frac{V \times 60 \times 100}{(TS \times RR)} \quad \text{Equation 1}$$

Where

V = total volume of the auxiliary tank (in cc)

TS = transport speed (in feet/min)

RR = replenishment rate (in cc/100 feet).

In one preferred embodiment of the present invention shown in FIG. 2, the total volumes V (in cc) of auxiliary tanks 42A–42L are stored in data storage memory 62. Also stored in data storage memory 62 is the transport speed TS at which film web 22 is being transported through the processor (which is typically based upon input signals from control panel 52). In addition, for each module 26A–26L, a plurality of basic required replenishment rates RR in cc/100 feet are initially supplied by an operator to microprocessor 48 through control panel 52 and control panel buffer 54, and are stored in data storage memory 62. The basic replenishment rates for each module preferably include a basic replenishment rate for each of several film types (e.g. 110, 126 or 135 format) which may be run through processor 20. In one embodiment in which seven film types are possible and a total of twelve modules (26A–26L) are used, a total of 84 replenishment rates are stored—seven for each module.

The control system of the present invention also stores in data storage memory 62, for each of a plurality of channels, "pattern information". This pattern information identifies those modules 26A–26L which are active during the particular process corresponding to that "channel".

In one preferred embodiment, three different "channels" are provided. "Channel 1" is a default condition in which all of the modules 26A–26L are active. "Channel 2" and "Channel 3" are set up by the operator through control panel 52, and include combinations of less than all of the modules 26A–26L. The particular channel to be used by microprocessor 48 is selected by the operator through a channel select switch or pushbutton on control panel 52, which provides an input signal to microprocessor 48. Thus by selecting a particular "channel", the operator identifies the particular process being used, and microprocessor 48 selects the proper pattern information stored in data storage memory 62. The last previously selected channel is stored by data storage memory 62 and is again selected when processor 20 is turned on, unless the operator takes action through control panel 52 to change the channel. Based upon this pattern information and the fill/dump cycle rates stored in data storage memory 62, and the identification of the particular film type based upon the signals from film type sensor 56, microprocessor 48 individually controls the replenishment to each of the tanks of processor 20. Microprocessor 48 causes replenishment to be supplied to those tanks identified by the stored pattern information for the selected channel. In this way, only those tanks which are in use in a particular processor receive replenishment.

An identification of the film type being run through processor 20 is made by microprocessor 48 based upon signals supplied by film type sensor 56 through film sensor buffers 58. In a preferred embodiment of the present invention, film type sensor 56 is like that shown in my copending patent application entitled "Photographic Film Type Sensor", Ser. No. 261,040, filed May 7, 1981, now U.S. Pat. No. 4,341,453, and assigned to the same assignee as the present application, although other types of film type sensors may also be used in conjunction with the present invention.

Each time a change in film type is detected, microprocessor 48 recalculates the cycle rate for each module based upon Equation 1, using the stored replenishment rates RR for the new film type. Based upon the cycle rates (which are stored by microprocessor 48 in data storage memory 62) and the pattern information for the selected channel, microprocessor 48 individually controls replenishment to each module 26 which is active during the particular process. Microprocessor 48 also recalculates cycle rates when new replenishment rates are supplied by the operator through control panel 52. The control system of the present invention preferably permits individual adjustment of selected replenishment rates as well as simultaneous adjustments of all replenishment rates relating to a particular film type.

The automatic replenishment control system of the present invention has several important advantages. First, it automatically provides correct amounts of replenishment to the correct modules 26A–26L for each of a variety of different processes which might be used in multiprocess cine processor 20.

Second, the present invention permits rapid changeover from one process to another, since replenishment rates and pattern information for each process to be used are stored previously and changeover of replenishment achieved simply by a channel select switch or pushbutton on control panel 52. Thus the changeover from one process to another requires only rethreading the film through the selected modules, and the changeover of the automatic replenishment system is achieved simply and quickly.

Third, the automatic replenishment control system of the present invention is usable with a wide variety of different cine processors. Although a multiprocess processor having twelve modular tanks is specifically illustrated in FIG. 1, an important advantage of the present invention is its adaptability to processors having any number of individual tanks.

Fourth, although the control system shown in FIG. 2 uses fill-and-dump dispensing of replenishment, the automatic replenishment system of the present invention is equally applicable to systems which use metering pumps to supply selected amounts of replenishment fluid on a continuous or intermittent basis to the various modules of the processor.

Although the present invention has been described with reference to preferred embodiments, workers skilled in the art will recognize that changes may be made in form and detail without departing from the spirit and scope of the invention.

What is claimed is:

1. In a multiprocess processor of photosensitive material of the type having a plurality of tanks for containing processing fluid and in which different photosensitive materials are processed by one of a plurality of different processes by being transported through a unique combination of the tanks, an automatic replenisher contol system comprising:

means for storing replenishment rates for the plurality of tanks;

means for storing pattern information indicative of those tanks of the plurality which are in active use during each of the plurality of different processes;

means for providing a signal indicative of the process in use; and means for automatically providing replenishment of processing fluids to tanks that are in active use based upon the stored replenishment rates, the signal indicative of the process being used, and the stored pattern information associated with the process being used.

2. The invention of claim 1 wherein the means for storing replenishment rates stores, for each of the plurality of tanks, plurality of replenishment rates for use with different photosensitive material types; wherein the automatic replenisher control system further includes means for providing a signal indicative of the photosensitive material type being processed; and wherein the means for automatically providing replenishment selects the stored replenishment rates used in automatically providing replenishment based upon the signal indicative of the photosensitive material type being processed.

3. An automatic replenisher control system for controlling replenishment of processing fluids to a multiprocess processor of photosensitive material of the type having a plurality of tanks for containing processing fluids and in which different combinations of the tanks are used in conjunction with different processes, the automatic replenisher control system comprising:

means for storing replenishment rates for the means for each of a plurality of different photosensitive material types;

means for storing pattern information indicative of the tanks in active use in each of a plurality of different processes;

means for providing a first signal indicative of one of the plurality photosensitive material types;

means for providing a second signal indicative of one of the plurality of processes; and means for automatically controlling replenishment to selected tanks as a function of the stored replenishment rates, the stored pattern information, and the first and second signals.

4. In a processor of photosensitive material having a tank for containing processing fluid for processing photosensitive material and having replenisher means for dispensing a predetermined volume of replenisher fluid to the tank periodically at a cycle rate, an automatic replenisher control means comprising:

means for storing a plurality of replenishment rates for use with a plurality of different photosensitive material types;

means for storing a value indicative of the predetermined volume;

means for providing a signal indicative of transport speed of the photosensitive material through the tank;

means for providing a signal indicative of the photosensitive material type being processed;

means for automatically determining the cycle rate as a function of the stored predetermined volume, the signal indicative of transport speed, and the stored replenishment rate corresponding to the photosensitive material type indicated by the signal indicative of photosensitive material type; and means for automatically controlling operation of the replenisher means to cause the replenisher means to dispense the predetermined volume of replenisher fluid at the determined cycle rate.

5. The invention of claim 4 and further comprising:

means for storing an indication of whether the tank is active or inactive during each of a plurality of different processes;

means for providing a signal indicative of the one process of the plurality which is in use; and wherein the means for automatically controlling the replenisher means causes the replenisher means to provide the predetermined volume of replenisher fluid at the cycle rate if the tank is indicated to be active during the process in use and inhibits operation of the replenisher means if the tank is indicated to be inactive during the process in use.

* * * * *